United States Patent [19]
Sinniger

[11] 3,896,376
[45] July 22, 1975

[54] CIRCUIT ARRANGEMENT FOR TESTING INSULATION BY PARTIAL DISCHARGE TECHNIQUE

[75] Inventor: Edgar Sinniger, Zurich, Switzerland
[73] Assignee: Micagil A.G., Zurich, Switzerland
[22] Filed: Dec. 12, 1972
[21] Appl. No.: 314,274

[30] Foreign Application Priority Data
Dec. 17, 1971   Germany............................ 2162896

[52] U.S. Cl. ............................ 324/158 MG; 324/55
[51] Int. Cl. ........................ G01r 31/00; G01r 31/06
[58] Field of Search ........................ 324/158 MG, 55

[56] References Cited
UNITED STATES PATENTS

| | | | |
|---|---|---|---|
| 2,568,406 | 9/1951 | Packer et al. | 324/158 MG |
| 2,640,100 | 5/1953 | Packer et al. | 324/158 MG |
| 2,890,407 | 6/1959 | Huehn | 324/158 MG |
| 3,622,882 | 11/1971 | Gardner | 324/158 MG |
| 3,742,346 | 6/1973 | Specht | 324/55 |

*Primary Examiner*—Alfred E. Smith
*Assistant Examiner*—Ernest F. Karlsen
*Attorney, Agent, or Firm*—Pierce, Scheffler & Parker

[57] ABSTRACT

Apparatus for testing the insulation of a commutator type armature winding and checking the resistance of the winding at points between pairs of commutator segments comprises an inductor-stator provided with a multiphase winding and within which the armature is mounted in a non-rotative manner for testing. A pulse-like rotating magnetic field produced in the stator winding by means of an oscillating circuit induces high test voltages in the winding which are taken out through contact pins connected to the commutator segments to an active filter unit which separates the high-frequency partial-discharge voltages from the test voltage, the filter unit being followed by a discriminator which determines whether the insulation on the armature winding is satisfactory or not.

The ohmic resistance of the armature winding is measured by application of a test current which is sent through different parts of the winding in succession established by connection of a d.c. test voltage to successive pairs of the commutator segments, the magnitude of the test current in each instance being indicative of the resistance value of the part of the winding being tested.

4 Claims, 5 Drawing Figures

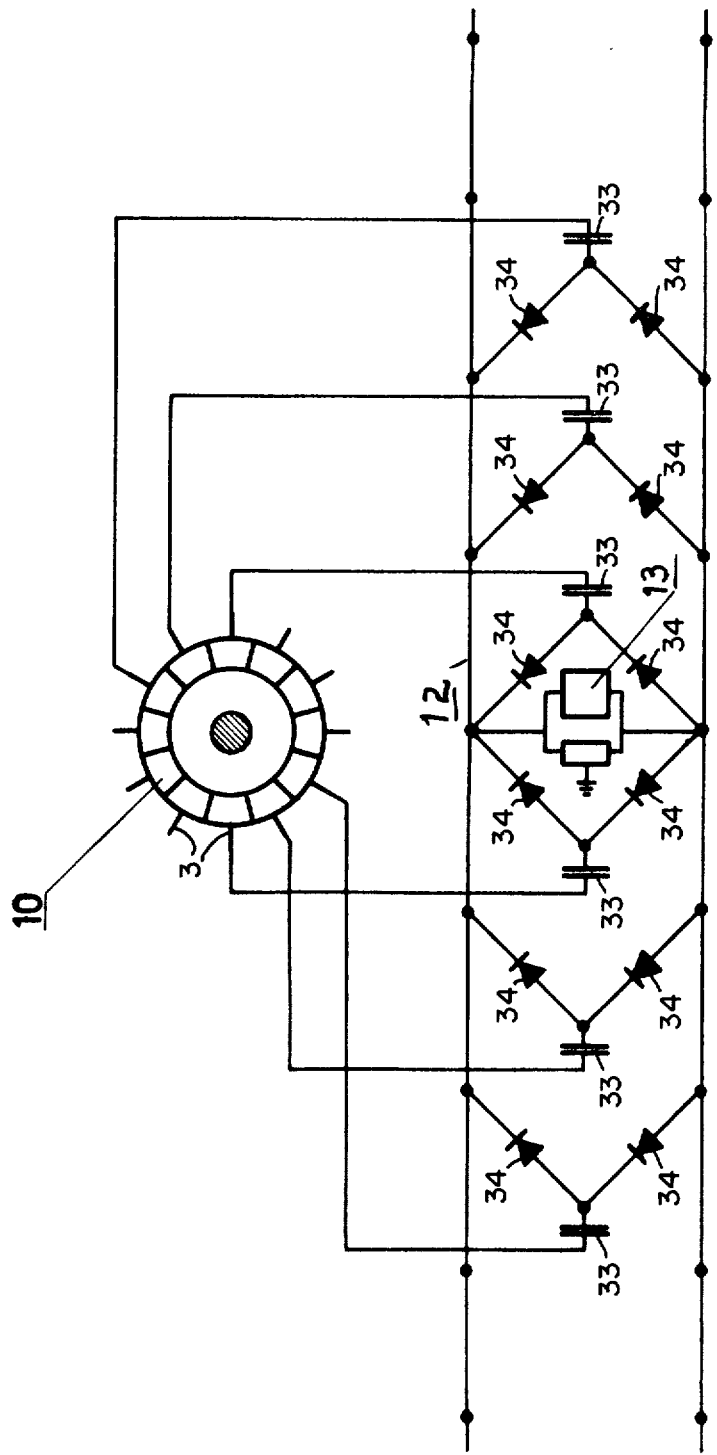

CIRCUIT ARRANGEMENT FOR TESTING INSULATION BY PARTIAL DISCHARGE TECHNIQUE

This invention concerns a circuit arrangement for the testing of insulation on the basis of partial-discharge measurements, and for measuring the winding resistances of rotating electric machinery.

The testing of coils, especially coils of rotating electric machines, by means of devices which permit primarily the detection and location of faults between turns, has been part of the state of the art for some time (see published German application 1,008,819). It is also known to test for faults between turns by means of an electronic apparatus employing a pulseshaped current (see periodical Elektronik 1959, vol. 9, p. 281)

All known methods for measuring the insulation stability have one point in common, namely that a test potential of a predetermined frequency or voltage is applied either directly or indirectly to the winding to be examined, whereby a measuring device differentiates solely between "good" and "bad" armatures, according to the occurrence or non-occurrence of a puncture.

Also known are partial-discharge testing devices for use in the high-tension range. (see publications VDE 0434, parts 1 and 2 / 1, 1966). Heretofore, testing devices of this type have not been used to check the insulation on the basis of partial-discharge measurements for electric machines in the low-tension range.

The testing devices of record however have various disadvantages and deficiencies, especially with respect to rotational fixed clamping, the starting of the rotary motion and, after completion of the test, the braking and the unclamping of the components to be tested. This method is time-consuming and therefore too costly in case of mass-production. An evaluation of the test results by means of oscilloscopes or other visual instruments can easily lead to subjective answers.

The testing of the insulation can be carried out only by employing a testing voltage which is only slightly higher than the operating voltage because neither the velocity of rotation within the magnetic field nor the induction (saturation) can be increased significantly in relation to the working conditions.

Especially, in the case of the known methods and devices it is not feasible to determine the insulation stability of the coils and component coils relative to each other; it is only possible to check whether the insulation meets requirements under a voltage load similar to the operating voltage.

It is the principal object of the invention to overcome the deficiencies of the known arrangements and to establish a circuitry to test the windings of rotating electric machines which makes possible a testing of the insulation on the basis of partial-discharge measurements and the measuring of the winding resistances within a single system.

The invention solves this problem in that manner that for the partial-discharge measurement an electronic pulse emitter is connected to an inductor-stator, that a non-rotating commutator armature is placed within the inductor-stator, and that there are arranged contact pins, actuated in known manner, for data transmission between the commutator segments and an electronic measuring circuit with an active filter, and that furthermore there is present, for the purpose of measuring the winding resistances, an additional electronic measuring circuit, serviced by a fed-in measuring current.

This arrangement proposed by the invention makes possible the determination of the degree of the partial-discharge at the points of insulation under maximum stress. The electronic measuring circuit will give reliable data even for very brief testing periods. Furthermore, the measuring of the winding resistance at commutator armatures can be carried out concurrently by the same testing apparatus through an additional measuring circuit.

A preferred species of the invention is designed in that manner that are arranged within the electronic pulse emitter a polyphase transformer to supply an oscillating circuit, formed by a winding of the inductor-stator and a condenser, by way of a thyrister gate control, as well as use of a "Triac" or two thyristors in antiparallel combination to control the interval of the oscillations within the oscillating circuit.

The above discussed electronic means make is possible to induce a testing voltage in the commutator armatures to be examined whereby this induced testing voltage is a multiple of the operating voltage. It will be advisable to select the testing voltage, in accordance with the requirements for insulation stability of the commutator armatures, in such manner that it will just be high enough to evaluate the safety of all commutator armatures provided with the selected insulating means. For the purpose of the partial-discharge measurement it will be expedient to provide a capacitive multiple-bridge circuit, an electronic measuring circuit as active filter, formed by a high pass filter and a succeeding cathode-follower-amplifier with rectifier stage, a discriminating circuit and also known indicating devices, preferably measuring instruments and counters.

This arrangement will permit ascertainment, evaluation and visual indication of the insulation stability of windings, while avoiding to a great extent any overloads which would lead to faults between turns during the testing operation.

In the case of a preferred species, there are arranged within the circuitry for measuring the winding resistances of commutator armatures a measuring-current-source, succeeded by a measuring circuit which comprises a shift register control, a timing pulse generator, a programmed counter and an amplifier, as well as a discriminating circuit.

The testing results are obtained by an arrangement of this type without being influenced by the service personnel, so that subjective sources of error will be eliminated, thus insuring a true quality control for the insulation and the resistances of commutator armature windings. As a result, personnel service requirements are greatly reduced for manual testing operations, and are eliminated in the case of automatic testing.

The accompanying drawings depict one species of the circuitry in accordance with the invention wherein:

FIG. 5 is a somewhat more detailed circuit diagram of the capacitance bridge component of the test circuit.

Figure 1:
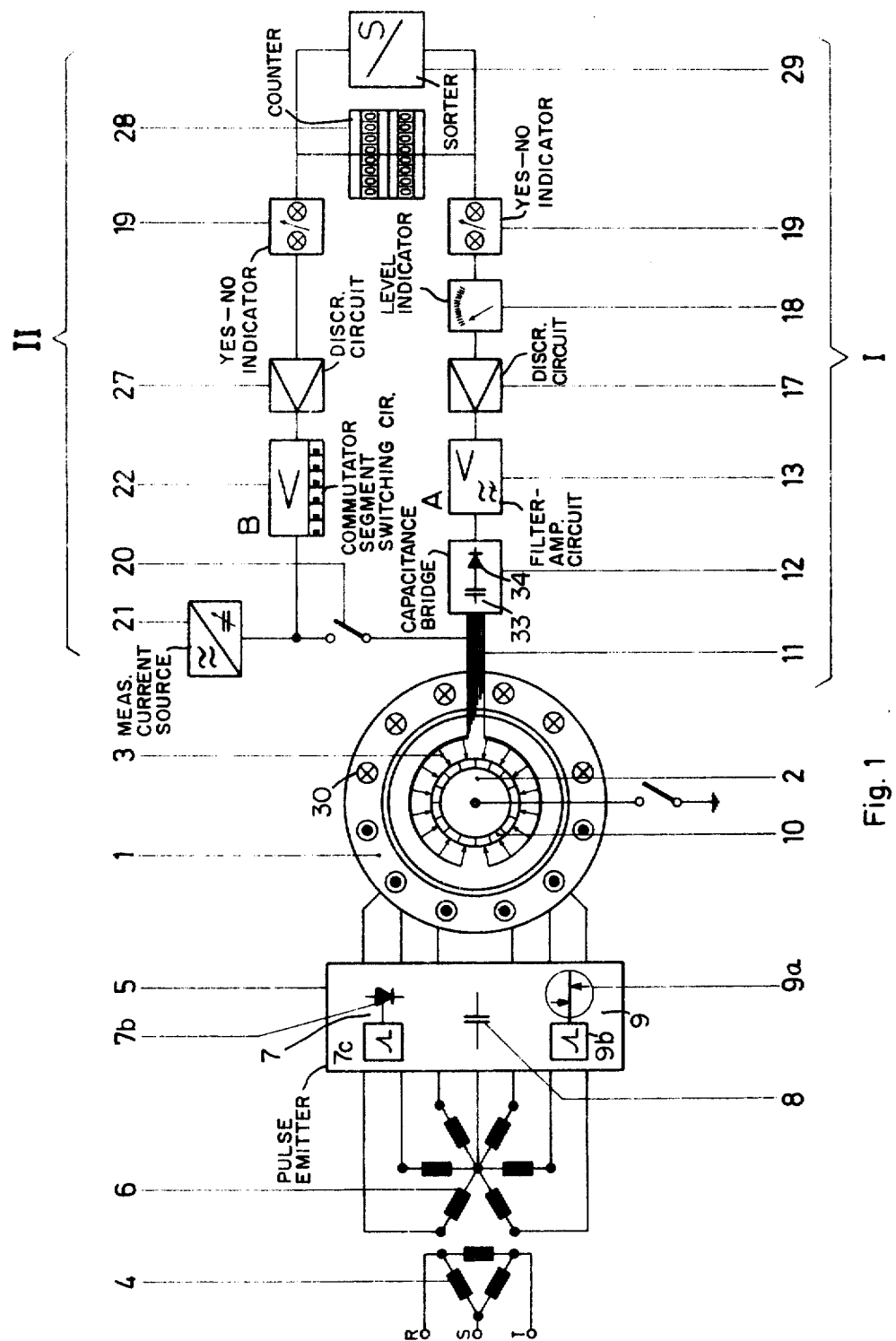
FIG. 1 shows a layout of an apparatus to test the insulation on the basis of partial-discharge measurements, and to measure the winding resistances of commutator armatures.

With reference now to FIG. 1, the testing apparatus is composed of an insulation-testing-component I -"Voltagetester" -, and a resistance-testing-component II - "Current-tester," a power line connection 4 for both components, an electronic pulse emitter 5 with a, for example, six-phase transformer 6 and an inductor-stator 1 within which there is arranged a commutator type armature 2 the winding of which is to be tested. The electronic pulse emitter 5 is formed by an oscillating circuit which consists of a condenser 8 with a Triac 9, or its equivalent, i.e. two thyristors connected in an antiparallel manner, not illustrated, and one coil each of the inductor-stator, whereby the condenser is charged by the secondary winding of the transformer 6 by way of a gate control provided by thyrister 7. The induced voltages, being generated at the commutator segments 10 of the commutator armature 2, are transmitted by way of the contact pins 3 through the measuring line 11, are transferred in a contactless manner by means of a capacitive multiple bridge circuit 12 illustrated in FIG. 5 to an electronic circuit 13 which acts as an active i.e. an amplifying filter, and are then evaluated in a discriminator circuit 17. A level indicator 18, a YES/NO test by luminous indicator 19, an item counter 28 and a sorter 29 record the test data, or separate the tested commutator armatures in question.

Within the resistance-testing component II a connection is made by the measuring line 11 by way of a switch 20 to a current-source 21, to an electronic measuring circuit 22 which functions to connect commutator segments of the armature in sequence and in a pair-like manner to the measuring current source and to a discriminator circuit 27, components which will evaluate the voltage drops occurring during the testing operation. Connected to the output of the discriminator circuit 27 is another YES/NO indicator 19, followed by connection to the item counter 28 and sorter 29.

Figure 2:
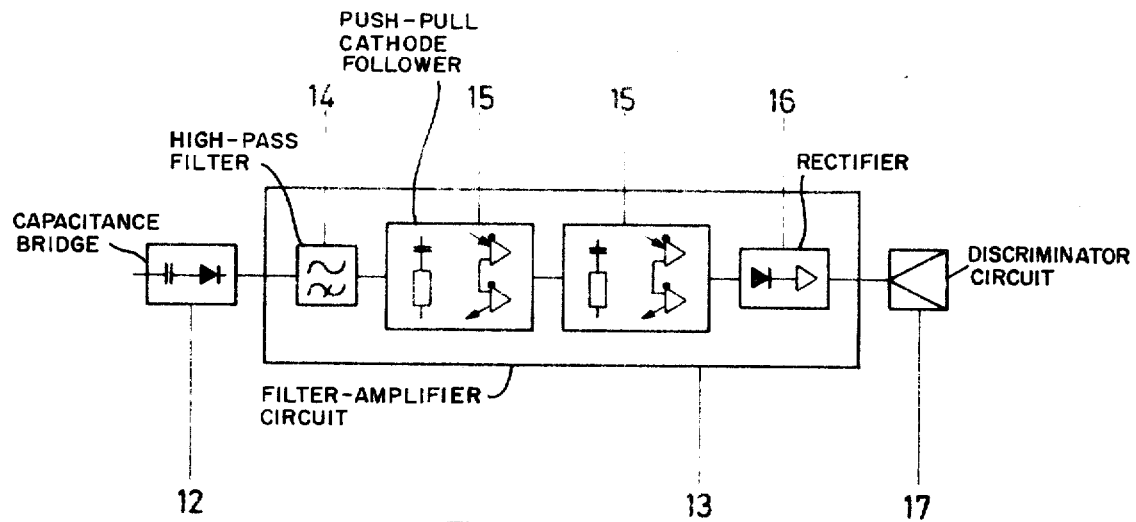
FIG. 2 shows an electronic circuit of an active filter for the determination of the degree of the partial-discharge in detail (part A of FIG. 1)

FIG. 2 depicts the various components of the electronic circuit 13 which functions as an active filter and which comprises a high-pass filter 14, an RC push-pull cathode follower 15 and a rectifier 16. The active filter is connected between the capacitive multiple bridge circuit 12 and the discriminator circuit 17.

Figure 3:
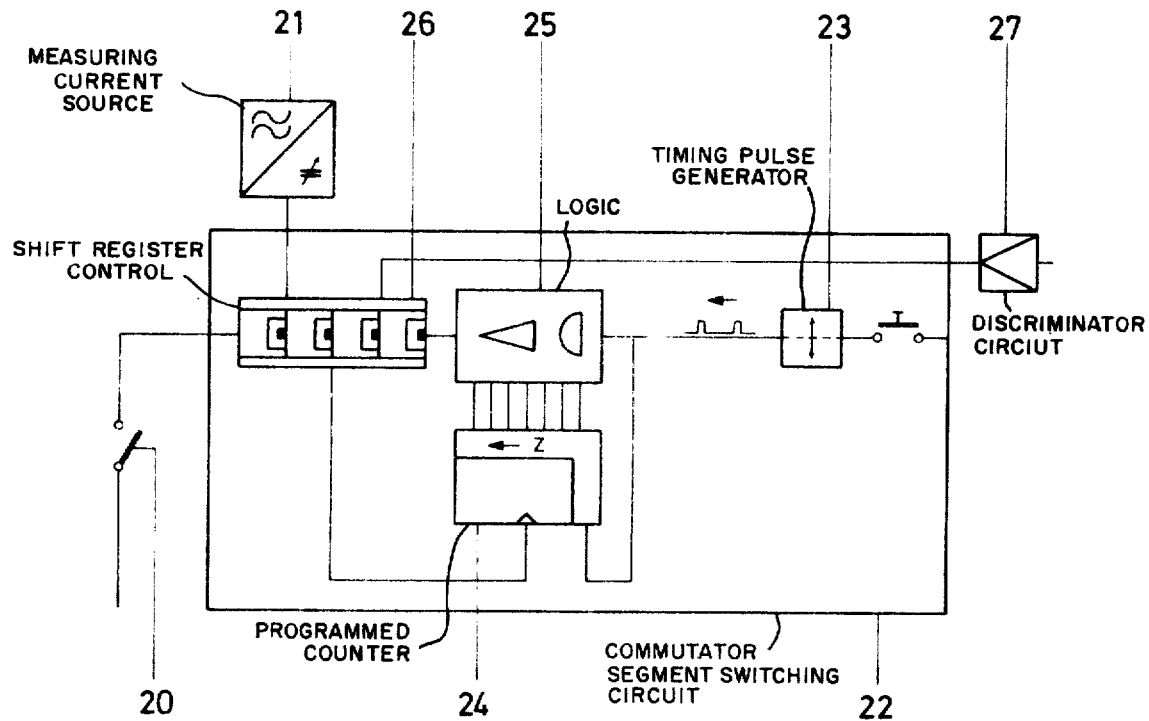
FIG. 3 shows an electronic circuit for the continuous switching of the measuring current, with an amplifier, from segment to segment in detail (part B of FIG. 1).

FIG. 3 shows the various components of the electronic circuit 22 for determining the winding resistances, namely a timing pulse generator 23, a programmed counter 24, an amplifier with logic element 25 and a shift register control 26. This electronic circuit 22 is connected between the switch 20, or measuring-current-source 21 respectively, and the discriminator circuit 27.

The method of operation of the testing apparatus for insulation and resistance checking of commutator armature windings will now be described in detail by using FIG. 1 as the basis for explanation. In order to carry out the two different testing operations, the commutator armature 2, with its windings to be tested, is inserted into the inductor-stator 1, and will remain there fixedly and without rotating throughout the entire testing period. The connection of the winding turns of commutator armature 2 with the I component - Voltage-tester, or II component, Current-tester, respectively, is accomplished through the commutator segments 10, to which the winding turns are connected, in known manner automatically by means of a circumferential array of contact pins 3 which are selectively actuated by pneumatic cylinders, which are not illustrated in detail.

For the insulation test, the inductor-stator 1 is equipped, for example, with a two-pole six-phase winding 30, thus attaining a rotating magnetic field with a spatial shift angle of 30°. The magnetic fields in the six phases are generated in power line synchronization by an electronic control in a time sequence of 1000 ms/($f$ . 6). The field, rotating with a time per step of 3.3 milliseconds (ms) at 50 Hertz, induces a test voltage, at a given frequency, in the winding of the commutator armature 2. In order to induce a high test voltage, representing a multiple of the operating voltage, a condenser discharge with electronic control means are employed to control the intensity of magnetization in a manner described below. The circuitry is constructed in such manner that a periodic, damped and sinusoidal test voltage is generated which during each magnetic field step time, for example, 3.3 ms at 50 Hertz, will be applied across the partial winding of the commutator armature 2 to be tested, thus attaining a high utilization factor for the condenser impulse.

Figure 4:
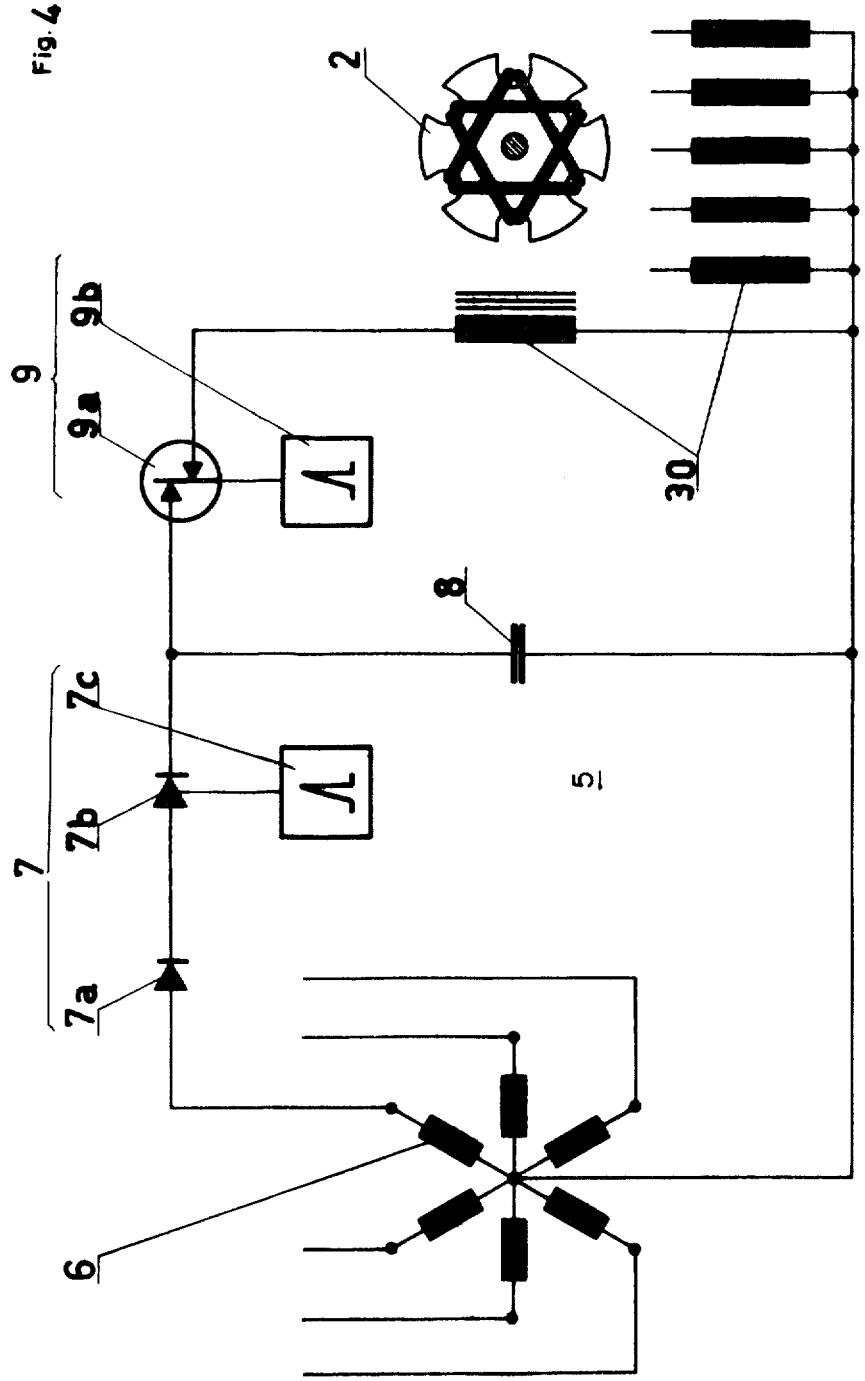
FIG. 4 is a somewhat more detailed circuit diagram of the pulse emitter component of the test circuit shown in FIG. 1.

The frequency of the test voltage oscillations will be in the 1,000 to 2,000 Hertz range, depending on the inductance of the commutator armature 2. The connection of the three-phase power line 4 to the electronic pulse emitter 5 takes place by way of the six-phase transformer secondary winding 6 each phase of which is correlated to a corresponding coil of the six-phase inductor stator winding 30 as shown in FIG. 4. The winding on the stationary commutator armature 2 within the inductor-stator 1 is induced by a pulse-like rotating magnetic field. The pulse-like, magnetic flow-through of the winding of the inductor-stator 1, including the commutator armature 2, is produced by an oscillating circuit, comprising the condenser 8, Triac 9 with control electronics acting as an electronic switch, and one of the coils 30 of the inductor-stator 1, whereby the condenser 8 is charged through the six-phase secondary winding of the transformer 6 by way of the gate control 7, consisting for example of a charging thyristor 7b with electronic control unit 7c and a diode 7a. The energy of the condenser 8 excites the relevant coil 30 of the inductor-stator 1, with the wound commutator armature 2 inserted therein, thereby attaining the high rate of flux change. The mentioned triac 9 which operates as an electronic switch controls the time sequence of the oscillations in the oscillating circuit, it being illustrated as a discharge triac 9a with an electronic control unit 9b.

More specifically, as previously explained, the pulse emitter 5 provides oscillatory circuits each consisting of a condenser 8, a Triac 9 and one coil 30 each of the inductor-stator 1. The charging circuit for each coil includes a corresponding one of the six transformer secondary windings 6. Each condenser 8 is periodically charged by the voltage induced in the corresponding transformer winding 6 by way of its gate control 7, and is periodically discharged through its corresponding coil 30 by way of its corresponding Triac 9 while thyristor 7b of the gate control 7 is in a blocked condition. This results in generation by the coils 30 within the inductor-stator 1 of a rotary pulse-type magnetic field composed of individual test voltage pulses, each of which, as previously explained, has the configuration of a damped sinusoidal oscillation.

The insulation stability is ascertained by the presence, or non-presence, of identifiable partial-discharge peaks which are distributed over the peak value of the sinusoidal test voltage. The electronic change-over of the induced voltages, arising at the commutator segments, to the electronic measuring circuit is accomplished in a contactless manner by means of the capacitive multiple bridge circuit 12, consisting of diodes and capacitances.

As previously explained, connection of the winding turns of armature 2 with the voltage tester (1), is accomplished through the commutator segments 10 by means of a circumferential array of contact pins which respectively engage the commutator segments which are, in turn, permanently connected to different points on the winding in conventional manner. This is indicated schematically in FIG. 1 and in a more expanded manner in FIG. 5 wherein it will be seen that oppositely disposed sets of contact pins 3 are connected through corresponding sets of capacitors 33 and valves 34 to their common filter-amplifier circuit 13.

In order to determine the degree of the partial discharge, active filter 13 separates the high-frequency partial-discharge voltages from the fundamental of the test voltage pulses, oscillating at 1 to 2 kilocycles, as illustrated by FIG. 2 which shows the active filter 13, comprising the high pass filter 14, an RC push-pull cathode follower 15 with a successively arranged rectifier 16, and the discriminator circuit 17. The function of discriminator circuit 17 is to make a distinction, i.e. to discriminate as between an amplitude at the output of the filter-amplifier circuit 13 that is higher or lower than a specific level indicative of a satisfactory level of insulation. It thus indicates whether the insulation is satisfactory or insufficient. The level indicator 18 in the form of an indicating device, preferably a microamp meter, permits continuous adjustment. A YES/NO test by the luminous indicator 19, or an acoustic signal, serves as information for the operator. The item counter 28 is connected after indicator 19. In the case of automated testing it is feasible, for example in the sorting device 29 which follows the counter 28 using a magnetically controlled switch, to separate the flawless commutator armatures from the faulty items.

The ohmic resistance measurement of windings of stationary commutator armatures 2 is accomplished by use of a specific test current, obtained for example from a source 21 for direct test-current which is conducted through two adjacent commutator segments in each case (one pair of segments after another) where the voltage drop of the test current is compared in each instance with a preset value. For the continuous electric switching of the test current source 21 from segment to segment there is employed the electronic circuit 22, (see FIG. 3), comprising the timing pulse generator 23, programmed counter 24, amplifier and logic element 25, and shift register control 26. During the testing of the ohmic resistances of the winding turns which includes the transition points of contact at the commutator segments 10, the logic element, programmed according to the number of commutator segments, will insure that during the the course of one testing cycle all pairs of adjacent segments are connected with the measuring circuit. The relays operate under control of the logic element as shift registers for a changer-over of the test current to the various pairs of segments.

The following arranged discriminator circuit 27 for the resistance measurement, with response level settings, evaluates the occurring voltage drops of the test current. That is to say the function of circuit 27 is to make a distinction, i.e. to discriminate as between an amplitude at the output of rectifier 16 that is higher or lower than a specific level indicative of a satisfactory level of winding turn resistance. The measuring results are shown by the YES/NO tester in the form of luminous indicator 19. Similar to the process during the insulation test, the checked commutator armatures 2 are then counted by the item counter 28 and separated by sorting device 29.

I claim:

1. Apparatus for testing the insulation of a commutator type armature winding and for also separately checking the resistance of the winding which comprises, for insulation testing, an inductor-stator provided with a multi-coil winding and within which the armature is mounted in a non-rotative manner, means producing from test voltage pulses a rotary magnetic field within said inductor-stator including means for sequentially energizing said coils with corresponding test voltage pulses each of which has the configuration of a damped sinusoidal oscillation and which serve to induce corresponding voltage pulses in different portions of the armature winding, contact means engaged with the commutator segments and which connect the different portions of the armature winding with an active filter unit which serves to separate the high-frequency partial discharge components from the fundamental of the damped sinusoidal oscillation, and a discriminator connected to the output of said filter unit for determining whether or not the insulation on the armature winding is satisfactory; and which comprises for resistance testing, a test voltage source connected to successive pairs of the commutator segments through said contact means for effecting corresponding flows of test current through the corresponding parts of the armature winding, means for measuring the magnitude of the test currents which are indicative of the resistance of the winding parts, and a second discriminator connected to the output of said measuring means for determining whether or not the armature winding parts have satisfactory resistance values.

2. Test apparatus for wound commutator type armatures as defined in claim 1 wherein a capacitive multiple bridge circuit is included in said connection means from said contact means to said active filter unit, and said active filter unit is constituted by a high pass filter element, a cathode-follower amplifier connected to said high pass filter element and a rectifier connected to said cathode-follower amplifier.

3. Test apparatus for wound commutator type armatures as defined in claim 1 wherein said means for measuring the magnitudes of said test currents indicative of resistance characteristics of the commutator winding parts comprises a timing pulse generator, an amplifier with logic, a programmed counter, and a shift register control.

4. Test apparatus for wound commutator type armatures as defined in claim 1 wherein said means for producing said rotary magnetic field within said inductor-stator comprises a polyphase transformer, an oscillator circuit for each coil of said inductor-stator including a condenser connectible therewith, means for periodically charging each said condenser from a corresponding secondary winding of said transformer, and means for periodically connecting the charged condenser to its corresponding inductor-stator coil for discharge therethrough.

* * * * *

UNITED STATES PATENT OFFICE
CERTIFICATE OF CORRECTION

PATENT NO. : 3,896,376
DATED : July 22, 1975
INVENTOR(S) : EDGAR SINNIGER

It is certified that error appears in the above–identified patent and that said Letters Patent are hereby corrected as shown below:

[73] Assignee:    Name is misspelled – Should be:

MICAFIL A.G., –

Signed and Sealed this sixth Day of January 1976

[SEAL]

Attest:

RUTH C. MASON
*Attesting Officer*

C. MARSHALL DANN
*Commissioner of Patents and Trademarks*